March 6, 1945. P. J. GAYLOR 2,370,787
FLUORINATED COMPOUND AND METHOD OF PRODUCING SAME
Original Filed Jan. 11, 1934
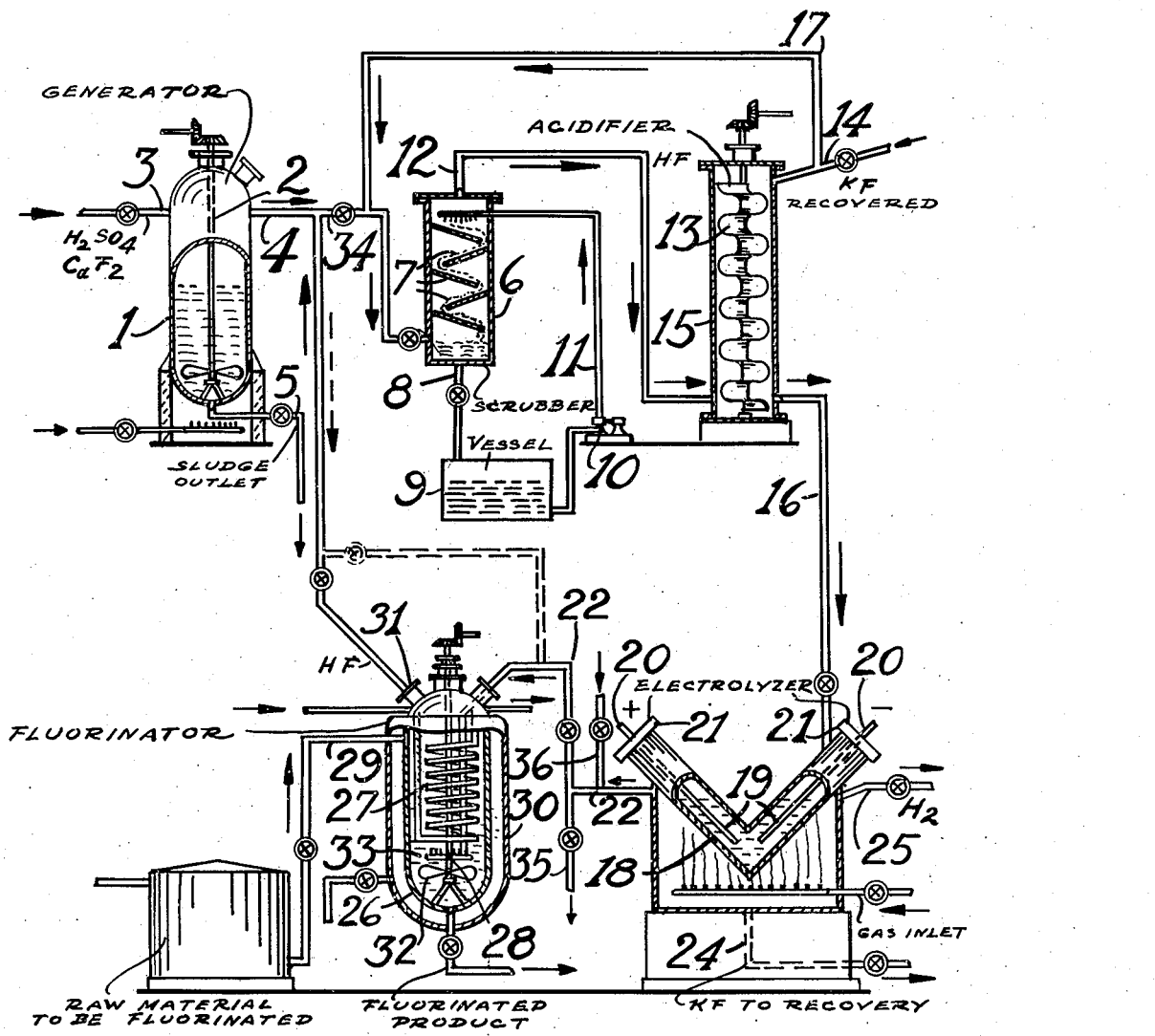
Peter J. Gaylor Inventor
By ___ Attorney Patented Mar. 6, 1945

2,370,787

UNITED STATES PATENT OFFICE 2,370,787

FLUORINATED COMPOUND AND METHOD OF PRODUCING SAME

Peter J. Gaylor, Union, N. J., assignor to Standard Oil Development Company, a corporation of Delaware Original application January 11, 1934, Serial No. 706,230, now Patent No. 2,186,916, dated January 9, 1940. Divided and this application February 2, 1939, Serial No. 254,209

4 Claims. (Cl. 252—63.2)

This invention deals with the preparation and use of relatively high boiling oils and solids containing fluorine. It especially involves the production of fluoro derivatives boiling above 200° C.

The present application is a division of my co-pending application Ser. No. 706,230 filed under my former name of Peter J. Wiezevich on January 11, 1934, now U. S. Patent 2,186,916 issued January 9, 1940.

In the drawing is shown in diagrammatic form an apparatus for producing fluorine-containing oils.

Heretofore chlorine derivatives have been used to a large extent for various purposes, as for example, non-inflammable impregnating agents, plasticizers, etc., without very much success. This is due mainly to the fact that aliphatic chlorine compounds are too unstable, especially in the presence of moisture and metals, giving off hydrochloric acid very readily, and often polymerizing to dark colored heavy products. The pure aromatic chloro derivatives, such as chlorinated diphenyls or naphthalenes, have been found to be quite stable at ordinary temperatures, but one of the main objections of such compounds is the fact that the chlorine affects the boiling point too markedly, so that if, for example, a really non-inflammable material is desired, the amount of chlorine required to give this effect would produce only solid products having very limited uses.

Fluorine compounds are much more stable than the corresponding chlorine derivatives, making it possible to utilize aliphatic compounds for purposes hitherto considered impractical with chlorinated products. Furthermore, in the case of aromatic hydrocarbons, for a given boiling point of the product, it is possible to introduce a considerably higher percentage of fluorine than chlorine, giving a much wider range of liquid and solid non-inflammable compounds for selection. Other advantages will be apparent from the subsequent description.

As raw materials for this process I employ organic substances, generally those capable of giving fluoro derivatives boiling above 400° F. and preferably those organic compounds boiling above 400° F. Such compounds as petroleum distillates, as for example kerosene, gas oil, lubricating oil, fuel oil, or cracking coal tar fractions, extracts of petroleum or its fractions obtained with solvents such as $SO_2$, phenol, nitrobenzene, furfural, cresol and other similar agents, treated oils, as white or refined oils, propane treated oils, hydrogenated or hydrofined oils, products of carbonization of mineral oils, coal, lignite, and the like, animal, vegetable, and fish oils and other glycerides, high boiling esters such as dibutyl phthalate, tricresyl phosphate, chlorinated esters, and other esters as those described in my co-pending application No. 690,234 filed on September 20, 1933, now U. S. Patent 2,104,408 issued January 4, 1938. Other compounds which may be so treated are chlorinated petroleum products, oxidation products of oils and waxes, sulfur containing compounds, high boiling alcohols, acids, ketones, amines, amides, aldehydes, ethers, heterocyclic compounds such as pyridine, thiophene, etc., aromatic compounds or coal tar products as naphthalene, diphenyl, benzene, toluene, xylene, diphenyl oxide, diphenylene oxide, and the like, chlorinated compounds such as chlorinated or brominated wax, chlorinated naphthalene, dichlorethyl ether, chlor-diphenyl, brombenzene, nitro compounds such as nitrobenzene, hexyl nitrate, cyclic compounds such as cyclohexane, tetralin, hexalin, dioxan, and the like, phenols, aniline and similar compounds, polymers such as polymerized isobutylene of 1,000 to 10,000 molecular weight, polystyrene, polyindene, polyvinyl acetylene, polychlorprene, and other polyvinyl compounds, or oxygenated polymers such as those described in my co-pending application Serial No. 701,343, filed on December 7, 1933, now U. S. Patent 2,123,641 issued July 12, 1938, as well as hydro rubber, rubber, chlorinated rubber, wax, petrolatum, thickened glycerides or voltolized mineral or glyceride oils, or stabilized esters such as those mentioned in co-pending application No. 690,235 filed on September 20, 1933, in the names of Peter J. Wiezevich and Luther B. Turner, now U. S. Patent 2,107,316 issued February 8, 1938, aromatic materials similar to those described in my co-pending application Serial No. 685,493 filed on August 16, 1933, now U. S. Patent 2,079,783 issued May 11, 1937, cellulose esters and ethers, resins such as the Bakelite, cumarone, and other types, rosin, shellac, plastics, products obtained by the action of the silent electric discharge, asphalts, and the like.

In general, the fluor derivatives may be prepared by treating the raw material with fluorine which may be conveniently obtained by electrolysis of a metallic fluoride such as $CaF_2$, KF, KFHF, and the like, or for example by methods such as those described in a co-pending application of Per K. Frolich and Peter J. Wiezevich, Serial No. 661,414, filed on March 17, 1933, now U. S. Patent 2,090,772 issued August 24, 1937.

A method which may be used to advantage is shown in the drawing. Numeral 1 is a generator for the production of hydrogen fluoride, equipped with stirrer 2 and suitable means of heating. These may be constructed of copper, iron coated with lead, resistant plastic, or other suitable corrosion resistant material. Sulfuric acid and calcium fluoride used for the production of the hydrogen fluoride may be introduced into the generator at 3, and the sludge formed drawn off at 5, while hydrogen fluoride vapor is led out at 4 directly to a scrubber 6, or through line 34 for indirect fluorination of chloro compounds as will be explained later. Scrubber 6, constructed of resistant metal or plastic is equipped with baffles or plates, 7, upon which may be circulated a purifying solution such as a solution of fuming sulfuric acid containing 2–10% potassium dichromate. This mixture is well suited to remove sulfur dioxide and other impurities from the vapor. The solution is collected in corrosion resistant vessel 9 and circulated by pump 10 through line 11 into chamber 6, and may be replaced when exhausted. The purified HF issuing from line 12 is allowed to contact with an aqueous solution of KF or with solid finely ground KF entering the acidifier 15 at 14. By suitable countercurrent contactor such as a screw conveyor or baffle type of apparatus, 13, the HF is caused to react with the KF to produce the double salt KFHF which is removed at 16. Any unused HF may be recirculated by forcing it through line 17.

The double salt KFHF (19) is then electrolyzed in a copper electrolyzer 18 equipped with carbon electrodes 20 and suitable insulating caps 21 made of fluorspar or the like, and heated by some suitable means. It is preferable to keep the temperature at 200–350° C. in the electrolyzer, so that by a current of 10–20 amperes at about 15 volts, a reasonably steady stream of fluorine may be maintained at 22 and drawn off to storage through line 35, or led directly into fluorinator 26. Hydrogen will be liberated at 25, and may be collected in a suitable reservoir. The pressure on both sides of the V of the electrolyzer must be kept at the same value as closely as is practical, since otherwise the fluorine or hydrogen would mix.

The fluorine so formed is led into fluorinator 26 equipped with jacket 30 and inner coil 27 capable of cooling or heating the contents 33, while they are stirred with stirrer 32. The material to be fluorinated, such as mineral or vegetable oil, naphthalene, diphenyloxide, etc. is led into the vessel through 29 and reacted with the fluorine dispersed through it by a spray forming arrangement 28.

A suitable solvent or liquid reaction medium such as carbon tetrachloride, or the like may be introduced with the raw material in order to decrease the violence of the reaction. An inert gas or vapor such as nitrogen, carbon dioxide, and the like may also be introduced with the fluorine (from 10 to 90% of the total mixture) through line 36 to assist in the same manner. It is sometimes advantageous to introduce chlorine, hydrogen chloride, hydrogen fluoride or other halogen or halogen compounds with the fluorine. Any HF formed in the reaction may be bled off at 31 and collected or introduced at some point such as 34 for recovery. In the case of very reactive compounds such as naphthalene and many other organic compounds, it is necessary to lower the temperature of the fluorinator considerably to obtain the best results. Temperatures below 0° F. as for instance −0° F., −70° F, or even lower may be used. In such a case a slurry of solid naphthalene in carbon disulfide may be so treated. Fluorination catalysts, as for example bromine, antimony trichloride, antimony pentafluoride, and the like, may likewise be present.

Another alternative method which may be employed with raw materials reactive with HF, as chlorinated organic compounds boiling above 400° F., unsaturated hydrocarbons, unsaturated glycerides, drying oils, oxygenated compounds, etc. is to lead the HF gas from 34 directly into the fluorinator 26 through line 35. This is also a means of stabilizing unstable organic compounds. Heat may also be used, as for example temperatures of 40° F., 100° F., 200° F., 450° F. or even 500° F. with or without the use of superatmospheric pressure. In such cases it is generally desirable to carry out the reaction in presence of a fluorination catalyst such as iodine, and the like, or a metal halide or metal fluoride as for example antimony penta or tri-chloride, bismuth trichloride, boron trifluoride, etc. For example, chlorinated castor oil or chlorinated wax may be introduced into the fluorinator at 29, together with some antimony chloride (say ½ to 20% by weight), and reacted with HF entering at 22. A solvent such as kerosene, naphtha, white oil, or cyclohexane may be added with the charge. After the reaction has progressed to the desired stage, the products may be drawn off at 37, or they may be drawn off continuously while a continuous stream of raw material is fed in. In many cases it is not necessary to replace all of the chlorine in the material treated, and the resulting chloro-fluoro compound can be employed for a variety of purposes. Sometimes the products are suitable even when only very small quantities of fluorine are present.

The materials produced according to this invention may be employed as blending agents in lubricants, as for example as extreme pressure lubricants or fire resisting lubricants, and they may be used as such, without diluents, for the preparation of lubricating oils, turbine oils, greases, and the like. For example, a blend of 5 to 50% or more of a fluoro compound in a mineral, synthetic or glyceride oil is satisfactory for reducing the inflammability, while 0.01 to 5% of the fluoro or fluoro-chloro compound may be used as an oxidation or polymerization inhibitor, or as a blending agent to improve the oil in other respects.

The products, such as those containing between 5 to 60% fluorine or more, may also be employed as coatings, impregnating materials for fibrous substances as wood, cloth, and the like, as ingredients in paints, varnishes, lacquers and enamels. Due to their stability and combustion resistant properties, they serve as valuable compounding agents in rubber, asphalts, resins, fireproofing compounds, building materials, and the like, especially when they contain from 1 to 50% or even as high as 70% fluorine. They are valuable as blending agents in fuels, solvents, waxes, plastics, and other similar products, alone, or together with dyes, pigments, fillers and compounding agents. They also serve as extraction agents for improving the quality of light and heavy petroleum hydrocarbons, as precipitating agents, and as non-igniting oils for lubrication, insulation, for use in transformers, cables, condensers, and other similar purposes, especially when they contain from approximately 10 to 60% fluorine. Plastic compositions containing 5 or 10 to 60% of such fluorinated organic compounds are very suitable as moulding materials for various articles of furniture, equipment, etc. Resins may be fluorinated, especially when dissolved in solvents or admixed with other ingredients so as to contain 5 to 50% fluorine or even more. Various other materials such as paper, wood, cloth, leather, and the like may be treated with fluorine to improve the qualities thereof.

The fluoro compounds produced by the methods described may also be employed to advantage as raw materials for chemical syntheses. For example, they may be condensed with aromatic hydrocarbons, other aromatic compounds, halogenated compounds, and the like, to yield excellent blending agents for lubricants or fuels. They may also be reacted with materials of the sodium polysulfide type to yield useful plastics and oils. Numerous other condensation, polymerization, defluorination, and addition reactions may be carried out to produce useful products.

I claim:

1. A liquid insulating composition comprising a fluorinated derivative of mineral wax, said derivative containing approximately 10 to 60% fluorine by weight.

2. A liquid insulating composition comprising a fluorinated derivative of petrolatum, said derivative containing approximately 10 to 60% fluorine by weight.

3. An insulating composition comprising a fibrous organic substance impregnated with a fluorinated derivative of a mineral wax, said derivative containing approximately 10 to 60% fluorine by weight.

4. An insulating composition comprising a fibrous organic substance impregnated with a fluorinated derivative of petrolatum, said derivative containing approximately 10 to 60% of fluorine by weight.

PETER J. GAYLOR.